United States Patent [19]

van den Bergh et al.

[11] Patent Number: 4,998,797
[45] Date of Patent: Mar. 12, 1991

[54] OPTICAL WAVEGUIDE PLUG CONNECTION

[75] Inventors: Hubert van den Bergh, Goumoens-la-Ville; Georges Wagnières, Lutry, both of Switzerland

[73] Assignee: Ciba-Geigy Corporation, Ardsley, N.Y.

[21] Appl. No.: 563,771

[22] Filed: Aug. 7, 1990

[30] Foreign Application Priority Data

Aug. 14, 1989 [CH] Switzerland ............... 2977/89

[51] Int. Cl.⁵ ............................................. G02B 6/38
[52] U.S. Cl. ............................... 350/96.21; 350/96.15
[58] Field of Search ............... 350/96.20, 96.21, 96.22, 350/96.15

[56] References Cited

U.S. PATENT DOCUMENTS

| | | | |
|---|---|---|---|
| 4,148,554 | 4/1979 | Magnusson et al. | 350/96.21 |
| 4,252,403 | 2/1981 | Salisbury | 350/96.15 |
| 4,265,511 | 5/1981 | Nicia et al. | 350/96.21 X |
| 4,557,554 | 12/1985 | Blanc | 350/96.20 |
| 4,753,510 | 6/1988 | Sezerman | 350/96.21 |
| 4,787,700 | 11/1988 | Yin | 350/96.21 |
| 4,900,114 | 2/1990 | Mortimore et al. | 350/96.15 |

FOREIGN PATENT DOCUMENTS

| | | | |
|---|---|---|---|
| 0207373 | 1/1987 | European Pat. Off. | 350/96.21 |
| 235992 | 9/1987 | European Pat. Off. | |
| 2301023 | 9/1976 | France | |

OTHER PUBLICATIONS

Connectour Optique—Haute Performance—Series PFO—1 page, no date.

*Primary Examiner*—John D. Lee
*Attorney, Agent, or Firm*—Harry Falber

[57] ABSTRACT

An optical waveguide plug connection for the transmission of high continuous wave light powers from an incoming optical waveguide into an outgoing optical waveguide comprises a metallic plug housing equipped with a metallic centering element. The incoming optical waveguide and the outgoing optical waveguide project into the centering element, the end faces of the two optical waveguides being arranged opposite each other. The width of the gap is approximately in the range of from 5 to 30 micrometres. The core diameter of the outgoing optical waveguide is approximately one third larger than the core diameter of the incoming optical waveguide. The gap is filled with gas. The plug housing is connected to a housing of large surface area which dissipates heat. Using this plug connection, continuous wave powers of up to some 100's of watts in the case of visible to infrared laser light can be transmitted with a high degree of coupling without danger to the end faces of the coupling connection.

12 Claims, 1 Drawing Sheet

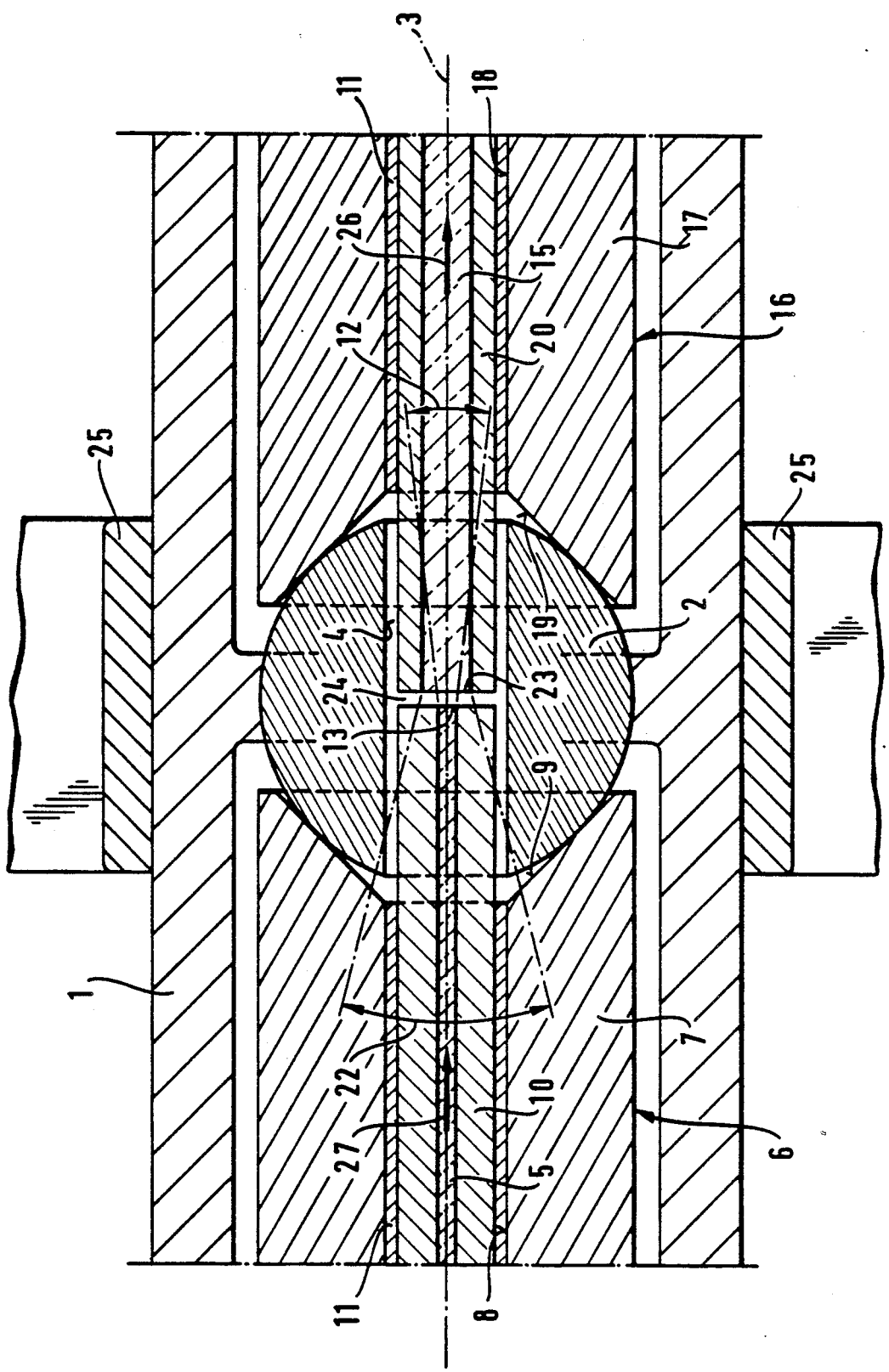

OPTICAL WAVEGUIDE PLUG CONNECTION

The invention relates to an optical waveguide plug connection for feeding laser light from an incoming optical waveguide into an outgoing optical waveguide, which comprises a metallic plug housing equipped with a metallic centering element into which there project the incoming optical waveguide provided in a first plug and the outgoing optical waveguide provided in a second plug, the end faces of the two optical waveguides being arranged opposite each other with a small gap between them.

A multimode optical waveguide plug connection of that kind for telecommunication purposes for the transmission of low light powers is known from the Radiall advertising leaflet "Connecteur optique—haute performance, serie PFO". In the known plug connection, the multimode optical waveguides to be connected, which are identical and are each fixed in a plug, are inserted into the plug housing in abutting relationship. An index matching medium is provided in the gap remaining between them.

A multimode optical waveguide plug connection of that kind is unsuitable for the transmission of high light powers in the range of several 10's of watts in continuous wave operation since the heat produced in the region of the end faces owing to reflexion and absorption losses evaporates the index matching medium and thus destroys the optical waveguide plug connection.

It is known from "Einführung in die optische Nachrichtentechnik" by Ralf Th. Kersten, Springer, Berlin 1983, pages 340 to 345 that an axial dislocation in the form of a gap between two identical optical waveguides gives rise to high coupling losses if the refractive index of the medium in the gap between the end faces differs from the refractive index of the core of the optical waveguide.

It is furthermore stated therein, on pages 333 to 339, that theoretically no losses occur when two optical waveguides are coupled to each other provided that the core diameters, the numerical apertures and the index profiles of the optical waveguides are identical. If, for one of those three parameters, the corresponding value for the incoming optical waveguide is smaller than the associated value of the outgoing optical waveguide, then, according to the teaching therein, undesirable, adverse coupling losses occur owing to the differing field distributions in the two optical waveguides which have to be matched to each other when coupling. It is furthermore proposed that optical waveguide-to-optical waveguide connections should be formed as far as possible by splices, since then there are no centering and disclocation problems with regard to the two optical waveguides.

Proceeding from that prior art, the object underlying the invention is to provide a multimode optical waveguide plug connection for the transmission of high continuous wave light powers.

This object is achieved in accordance with the invention by making the core diameter of the outgoing optical waveguide at least one third larger than the core diameter of the incoming optical waveguide and by connecting the plug housing to a housing of large surface area which dissipates heat.

The use of an optical waveguide that is at least one third larger in core diameter in conjunction with a small air gap allows reliable coupling of high continuous wave laser powers. The coupling heat which is unavoidably produced is given up to a heat-dissipating housing. In the relatively dust-free and germ-free atmosphere of an operating theater, the air gap between the end faces of the optical waveguides being coupled allows the different treatment and surgical instruments which are to be connected to the incoming optical waveguide to be changed easily and reliably. This can be done by the theater staff, while the laser supplying the light can be monitored and adjusted in an adjoining room.

In a preferred embodiment, the thickness of the gap between the end faces is in the range of from 5 to 50 micrometers, so that the coupling losses caused by the divergently scattering radiation in the air gap remain low.

In one arrangement of the invention, a metallic, throughbored ball is provided as the centering element, on which there glides from each side a centering cone of each plug. This allows different plugs to be centered on the main axis of the plug connection.

In a preferred embodiment, the ends of the optical waveguides are each fixed in a metal barrel. The metal barrels are firmly positioned in respective bores of the plugs with the aid of a soft metal mass in such a manner that the cores of the fixed optical waveguides are in alignment with each other and arranged concentrically with respect to internal parts of the plugs. By this means, the core of a fiber that is not arranged concentrically in relation to the cladding of the fiber can easily be aligned with the main axis of the plug and, consequently, the radiation can be coupled as centrally as possible into the core of the outgoing optical waveguide at the high light powers to be coupled.

By virtue of the numerical aperture of the outgoing optical waveguide being at least one half greater than the numerical aperture of the incoming optical waveguide, the laser light emerging from the incoming optical waveguide is efficiently coupled into the outgoing optical waveguide.

Both of the optical waveguides 5 and 15 may especially be stepped index optical waveguides to that the field distributions in the optical waveguides are similar.

The invention will be described in detail below with reference to the drawing which shows, in one schematic Figure, a multimode optical waveguide plug connection according to the invention.

The optical waveguide plug connection comprises a metallic, substantially hollow-cylindrical plug housing 1 in which a metallic centering ball 2, which is in good heat-conductive connection with the plug housing 1, is provided centrally. The centering ball 2 is throughbored along one radial axis which is in alignment with the main axis 3 of the optical waveguide plug connection. The bore 4 in the centering ball 2 has a diameter sufficient to receive clad optical waveguides.

A cylindrical plug 6 provided with an incoming optical waveguide 5 is pushed into the plug housing 1. The plug 6 is advantageously provided with an external internally threaded ring, not shown in the drawing, which engages an external thread provided on the plug housing 1 so that the plug 6 can be firmly connected to the plug housing 1.

The cylindrical internal part 7 of the plug 6 has a continuous bore 8 in which the incoming optical waveguide 5 is fixed. At the forward end of the plug 6, a centering cone 9 is provided which, together with the centering ball 2, centers the cylindrical plug 6 in alignment with the main axis 3 when the plug is being fixed in the plug housing 1. As the plug 6 is fixed by tightening the internally threaded ring onto the external thread, the centering cone 9 presses on the surface of the centering ball 2. In so doing, the internal part 7 moves normally to the main axis 3 until the axis of the plug 6 is aligned with the main axis 3.

The incoming optical waveguide 5 is fixed in a tubular metal barrel 10 which is fastened in the bore 8 of the plug 6 with the aid of a readily deformable metallic fixing mass 11. The metal barrel 10 advantageously consists of aluminium or steel, and the fixing mass 11 of lead.

The incoming optical waveguide 5 comprises a core and a cladding, which are not shown separately in the drawing. In the manufacturing process of an optical waveguide, mismatching with regard to the concentricity of the core with the cladding occurs. Since the cladding of the optical waveguide 5 is fixed in the metal barrel 10, the core of the optical waveguide 5 and the metal barrel 10 are frequently not concentric with each other. The core is permanently centered in the bore 8 of the plug 6 indirectly by means of the metal barrel 10 when the connection is being made between the plug 6 and the optical waveguide 5, by moving the core of the optical waveguide 5 to the main axis 3 by pressing on the fixing mass 11.

The arrangement of the centering cone 9 of the internal part 7 around the centering ball 2 of the plug housing 1 ensures that the core of the incoming optical waveguide 5 is in alignment with the main axis 3.

The incoming optical waveguide 5 may be, for example, a monomode glass fiber of having a core diameter of a few micrometers. Preferably, the incoming optical waveguide 5 is a multimode fiber of, for example, 200 micrometers core diameter, which has a cladding diameter of 280 micrometers. The numerical aperture of this glass fiber is, for example, 0.21, and the geometrical angle of emergence 12 from the end face 13, which is shown in simplified form, is, for example, 13 degrees.

A cylindrical plug 16 provided with an outgoing multimode optical waveguide 15 is pushed into the plug housing 1 from the side opposite the plug 6. Like the plug 6, the plug 16 is advantageously provided with a threaded ring, not shown in the drawing, which fits over the plug housing 1 and with the aid of which the plug 16 can be firmly connected to the plug housing 1.

The cylindrical internal part 17 of the plug 16 has a continuous bore 18 in which the outgoing optical waveguide 15 is fixed. At the forward end of the plug 16, a centering cone 19 is provided which, together with the centering ball 2, centers the cylindrical plug 16 in alignment with the main axis 3 when the plug is being fixed in the plug housing 1.

The outgoing optical waveguide 15 is fixed in a tubular metal barrel 20, preferably consisting of the same metal as the metal barrel 10, which is fastened in the bore 18 of the plug 16 with the aid of the metallic fixing mass 11. The core of the outgoing optical waveguide 15 and the outer radius of the internal part 17 are concentric with each other.

The outgoing optical waveguide 15 comprises a core and a cladding, which are not shown separately in the drawing. The core of the outgoing optical waveguide 15 is fixed in the bore 18 of the plug 16 indirectly by means of the metal barrel 20, analogously to the core of the incoming optical waveguide 5.

The arrangement of the centering cone 19 of the internal part 17 around the centering ball 2 ensures that the core of the outgoing optical waveguide 15 is in alignment with the main axis 3 and hence with the core of the incoming optical waveguide 5.

The outgoing optical waveguide 15 for the transmission of high continuous wave powers advantageously consists of a multimode light guide fiber having a large core diameter of, for example, 600 micrometers, which has a cladding, usually of plastics material, having a diameter of 1000 micrometers. The numerical aperture of this glass fiber is, for example, 0.48, and the geometrical maximum angle of entry 22 into the end face 23, which is shown in simplified form, is, for example, 29 degrees.

The end faces 13 and 23 of the mutually aligned cores of the incoming optical waveguide 5 and the outgoing optical waveguide 15 are spaced approximately from 5 to 30 micrometers apart. The gap 24 formed by this spacing is filled only with air and not with a coupling medium. Laser light, symbolised by an arrow 27, passed through the incoming optical waveguide 5 emerges from the end face 13 of the incoming optical waveguide 5 into the gas space of the gap 24. The laser light emerging substantially with the aperture angle 12 is coupled via the end face 23 into the outgoing optical waveguide 15 and is passed in the direction of the arrow 26 through the outgoing optical waveguide 15 to its end use.

The end faces 13 and 23 of the optical waveguides 5 and 15 are preferably rendered non-reflective. Owing to the differing core diameters, the differing numerical apertures and the necessarily differing field distributions in the optical waveguides 5 and 15, coupling losses occur. When the multimode optical waveguide plug connection is operated at 1064 nanometers light waveguide and 70 watts continuous wave light power, a few watts of loss heat are produced in a plug connection according to the invention.

The loss heat is conducted via the metallic centering ball 2 to the plug housing 1. The plug housing 1 is connected in a heat-conducting manner to a cooling housing 25 of large surface area which may be provided with fins for heat dissipation.

Both of the optical waveguides 5 and 15 may be stepped index optical waveguides, especially in order to match the field distributions of the laser light conveyed.

When using the described optical waveguide plug connection, the laser and the elements thereof to be adjusted may be located outside the operating theater. The incoming optical waveguide 5 leads from the laser into the operating theater. Using the multimode optical waveguide plug connection, continuous wave powers of up to some 100's of watts in the case of visible to infrared laser light can be transmitted with a high degree of coupling without danger to the end faces 13 and 23 of the coupling connection. In particular, the high continuous wave output power of 70 watts, for example of a YAG laser, can safely be coupled into the outgoing optical waveguide 15. Various medical treatment and surgical instruments can now easily be changed by the doctor by means of the optical waveguide plug connection.

In another arrangement of the optical waveguide plug connection, the gap 24 may also be filled with an index matching medium which is preferably transparent to the laser radiation supplied.

What is claimed is:

1. An optical waveguide plug connection for feeding laser light from an incoming optical waveguide into an outgoing optical waveguide, said plug connection comprising a metallic plug housing equipped with a metallic centering element into which there project said incoming optical waveguide provided in a first plug and said outgoing optical waveguide provided in a second plug, the end faces of said incoming optical waveguide and said outgoing waveguide being arranged opposite each other with a small gap between them, wherein the core diameter of said outgoing optical waveguide is at least one third larger than the core diameter of said incoming optical waveguide and wherein said plug housing is connected to a housing of large surface area which dissipates heat.

2. An optical waveguide plug connection according to claim 1, wherein the width of the gap between the end faces of said waveguides is predetermined in the range of approximately 5 to 30 micrometers.

3. An optical waveguide plug connection according to claim 1, wherein a metallic, through-bored ball is provided as said centering element, onto which there can be pushed from each side a centering cone of each of said plugs.

4. An optical waveguide plug connection according to claim 3, wherein the ends of said optical waveguides are fixed in respective tubular metal barrels which are fastened in respective bores of said plugs with the aid of a deformable metal mass in such a manner that the cores of said fixed optical waveguides are in alignment with each other and arranged concentrically with respect to internal parts of said plugs.

5. An optical waveguide plug connection according to claim 1, wherein the numerical aperture of said outgoing optical waveguide is greater than the numerical aperture of said incoming optical waveguide.

6. An optical waveguide plug connection according to claim 1, wherein said optical waveguides are stepped index optical waveguides.

7. An optical waveguide plug connection according to claim 1, wherein the core diameter of said outgoing optical waveguide is approximately one third larger than the core diameter of said incoming optical waveguide.

8. An optical waveguide plug connection according to claim 1, wherein said outgoing optical waveguide is a multimode optical waveguide.

9. An optical waveguide plug connection according to claim 8, wherein said incoming optical waveguide is a multimode optical waveguide.

10. An optical waveguide plug connection according to claim 1, wherein the space forming said gap is filled with gas or air.

11. An optical waveguide plug connection according to claim 1, wherein the space forming said gap is filled with an index matching medium.

12. An optical waveguide plug connection according to claim 1, wherein the ends of said optical waveguides are fixed in respective tubular metal barrels which are fastened in respective bores of said plugs with the aid of a deformable metal mass in such a manner that the cores of said fixed optical waveguides are in alignment with each other and arranged concentrically with respect to internal parts of said plugs.

* * * * *